3,480,378
PROCESS FOR DYEING LINEAR POLYESTER FIBER MATERIALS

Carl Taube and Karl-Heinz Freytag, Leverkusen, Germany, assignors to Farbenfabriken Bayer Aktiengesellschaft, Leverkusen, Germany, a German corporation
No Drawing. Filed Mar. 10, 1965, Ser. No. 438,749
Claims priority, application Germany, Mar. 21, 1964,
F 42,390
Int. Cl. D06p 3/52
U.S. Cl. 8—39　　　　　　　　　　　　　9 Claims

ABSTRACT OF THE DISCLOSURE

An improved process for the dyeing of synthetic and semi-synthetic fibre materials, e.g. linear polyester with an aqueous liquor containing a dyestuff which is water-insoluble or only slightly soluble in water and having at least one carboxylic acid group, and a volatile amine in an amount sufficient to dissolve the dyestuff; then drying the dyed material and heating it to drive off the volatile amine and leave the free carboxylic acid-containing dyestuff. The method enables the dyeing of hydrophobic synthetic fibres with aqueous solutions of carboxyl-containing dyes which were previously applied by the dispersion method.

---

The present invention relates to a process for dyeing synthetic and semi-synthetic fibre materials; more particularly it relates to a process for dyeing synthetic and semi-synthetic fibre materials by means of dyestuffs containing carboxyl groups and certain amounts of volatile amines sufficient to dissolve the dyestuff whereby the said dyestuffs and volatile amines are padded onto the materials, dried and subsequently heated at temperatures between 150 and 220° C.

It is an object of the invention to provide a new and valuable process for dyeing synthetic and semi-synthetic fibre materials with certain dyestuffs and assistants in a very simple manner yielding dyeings of excellent fastness properties. Another object of the invention is the provision of applying onto synthetic and semi-synthetic fibre materials dyestuffs which contain one or more carboxylic acid groups and which are preferably slightly soluble or insoluble in water whereby the dyestuffs are applied in dissolved form which is reached by the addition of volatile amines and thereby salt formation with the carboxylic acid group-containing dyestuffs, and subsequent splitting off of the dyestuff amine salts under certain heat treatment conditions and thus recovering the original carboxylic acid group-containing dyestuff on or in the fibre and bound very fast to wet processing onto the fibre. Still another object of the invention are synthetic and semi-synthetic fibre materials which are dyed by the above said methods and which exhibit excellent fastness properties. One further object of the invention is the coloring of fibrous materials made from aromatic polyesters such as polyethyleneglycol terephthalate, triacetate and 2½-acetate and said fibrous materials colored according to the aforementioned processes. Further object will appear from the following description of the invention.

It is known how to dye hydrophobic fibre materials, and in particular aromatic polyesters, triacetate fibres, 2½-acetate fibres and polypropylene fibres as well as polymers and copolymers of acrylonitrile with dispersion dyestuffs, the last named to light shades. Although this method produces dyeings with excellent fastness properties, it suffers from the disadvantage that it requires compounding of the dyestuffs which is often expensive in costs and labour and that the risk of flocculation in the dye liquor cannot always be completely avoided. As a matter of principle it is therefore preferable to apply aqueous solutions of dyestuffs during the dyeing operation, as is usual during the dyeing of hydrophilic fibres such as cotton, wool and the like. However, up to the present time no processes employing the preferred application of aqueous solutions of dyestuffs have been adopted with success. It is also known how to dye fibre materials of a hydrophilic nature with dyestuffs containing carboxylic acid groups or their alkali salts from an aqueous solution. However, an application of this method to hydrophobic fibres produces unsatisfactory results. Therefore, dyestuffs containing carboxyl groups have hitherto only been applied on hydrophobic fibres in the form of dyestuff dispersions, and the above described disadvantages arising during the preparation of the latter have had to be accepted.

It has now been found that synthetic and semi-synthetic fibre materials, and in particular those from aromatic polyesters such as polyethylene terephthalates and polyesters of terephthalic acid with 1,4-bis-hydroxymethyl-cyclohexane, cellulose triacetate, polyvinyl chloride, synthetic superpolyamides and superpolyurethanes can be dyed with dyestuffs which are on their own insoluble or slightly soluble in water according to the procedure known as the "Thermosol" process (thermofixation process), the method being extremely simple and producing excellent fastness properties, by the application of a padding liquor on the fibre materials which consists of a dyestuff containing carboxyl groups and an amount of a volatile amine sufficient for bringing this dyestuff into solution as well as optionally other assistants, the padded material then being subjected to intermediate dyeing and subsequently heated at temperatures of 150° to 220° C. The resultant dyeings can finally be after-treated by the usual method, for instance rinsed, and finished.

The application of the padding liquor on the fibre materials is carried out with the padding devices hitherto normally applied for this purpose in practical dyeing when the liquor sorption amounts to between 50 and 90%. The padding liquor can be prepared by introducing the dyestuff containing carboxyl groups, which should preferably be insoluble or hardly soluble in water, into the aqueous medium and stirring it with the aid of a volatile amine, for instance with ammonium hydroxide or a hydroxyalkylamine so that it is caused to dissolve by this method. The amount of the volatile amine required for the dissolution of the dyesuff can readily be ascertained by experiment. It will of course depend on the type of the employed dyestuff, i.e. on the molecular size, substitution and the number of free carboxyl groups of the dyestuff. In many cases, it is an advantage to employ an excess of the volatile amine.

The following are particularly suitable volatile amines which can be applied: ammonia, ammonium hydroxide and aliphatic amines such as methylamine, dimethylamine, trimethylamine, dimethyl-β-hydroxyethylamine, diethyl-β-hydroxyethylamine, di-β-dihydroxyethylamine, diethylamine, triethylamine, alkalamine and tri-n-propylamine; ammonia is the preferred volatile amine.

The dissolution of the dyestuff, which is present in the form of the free carboxylic acid and which is preferably insoluble or slightly soluble in water, by means of the volatile amines presumably depends on simple salt formation. The resultant ammonium salts of the dyestuffs containing carboxyl groups can in many cases be isolated; they are readily soluble or in any case more soluble in water than the dyestuffs containing the free carboxyl groups from which they are derived. The dyestuffs can therefore also already be added to the padding liquor in the form of their ammonium salts, but in that case a further addition of a volatile amine, for instance ammonia, is still recommended in order to counteract the hydrolysis and therefore a reprecipitation of the dyestuffs containing the free carboxyl groups.

The treatment of the padded fabric at temperatures of 150 to 220° C. (Thermosol process) is preferably carried out by means of dry heat during a period of 2 to 300 seconds in devices suitable for the purpose.

The novel process can be applied to any desired types of dyestuff as long as these exhibit at least one carboxylic acid group; it is preferred to employ those dyestuffs containing carboxyl groups which are slightly soluble or insoluble in water in the form of their free acids. The dyestuffs to be employed according to the process may for instance belong to the series of metal-containing or metal-free monoazo or polyazo dyestuffs or (azo) methine dyestuffs, of azaporphine dyestuffs, particularly to the series of copper or nickel phthalocyanines, or to the series of anthraquinone dyestuffs as well as condensation products of the latter which exhibit more than three anolated rings; other suitable dyestuffs are oxazine, nitro, diphenylamine, naphthalic acid, di- and tri-phenylmethane dyestuffs, naphtholactam condensation dyestuffs and dyestuffs derived from naphthoquinone and naphthoquinone-amine as well as other condensation dyestuffs. In addition to the carboxylic acid groups required in accordance with the definition, the dyestuffs may exhibit further usual substituents such as halogen, alkyl, cycloalkyl, aralkyl, aryl, alkoxy, aryloxy, nitro, sulphone, optionally substituted sulphonamide groups, optionally substituted or acylated amino groups, alkylthio and arylthio, hydroxy, hydroxyalkyloxy, aminoalkyloxy, cyano, cyanoalkyl as well as alkyl, aryl, aralkyl and similar radicals substituted in other ways.

The dyestuffs contain one or more carboxylic acid groups which are linked to aromatic nuclei of the basic dyestuff skeleton or to aryl, aralkyl or aliphatic groupings in external positions. The number of carboxyl groups generally amounts to between 1 and 8 and preferably amounts to between 1 and 4.

A large number of dyestuffs containing carboxyl groups are known and are prepared by methods known per se, by converting the corresponding dyestuff intermediates which exhibit one or several carboxyl groups attached to the nuclei or at an external position to the required end products whilst keeping the carboxyl groups and to carry out optional further conversion reactions on these end products. In the case of azo dyestuffs, the usual conversion reactions consist of diazotisation and coupling as well as condensation, and in the case of most of the other dyestuff classes they consist of condensation reactions. The following compounds may be mentioned as examples of suitable azo dyestuffs containing carboxyl groups:

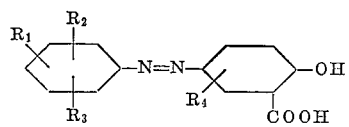

$R_1$, $R_2$, $R_3$=H, $CH_3$, $C_2H_5$, $OCH_3$, $OC_2H_5$, Cl, Br, $OCH_2COOR$, $NO_2$, COOH, $OCH_2COOH$, COOR (R=alkyl) $R_4$=alkyl

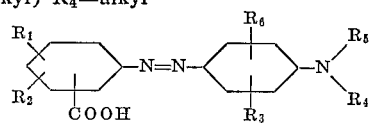

$R_1$, $R_2$=H, $CH_3$, Cl, Br, $NO_2$, $OCH_3$
$R_3$, $R_6$=H, $CH_3$, $OCH_3$, $OC_2H_5$
$R_4$, $R_5$=H, $CH_3$, $C_2H_5$, $CH_2CH_2OH$, $CH_2CH_2OR_7$ ($R_7$=acyl radical)

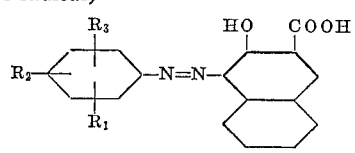

$R_1$, $R_2$, $R_3$=H, $CH_3$, $C_2H_5$, $OCH_3$, $OC_2H_5$, Cl, Br, $NO_2$, COOH

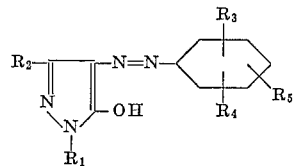

$R_1$=$C_2H_5$, $CH_2CH_2OH$, $C_6H_5$, $C_6H_4Cl$, $C_6H_4COOH$
$R_2$=$CH_3$, COOH
$R_3$, $R_4$, $R_5$=H, $CH_3$, $C_2H_5$, $OCH_3$, $OC_2H_5$, $OCH_2COOH$, COOH, COOR, $OCH_2COOR$, $NO_2$, Cl, Br, CN (R=alkyl)

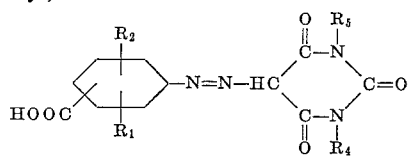

$R_1$, $R_2$=H, $CH_3$, $C_2H_5$, $OCH_3$, $OC_2H_5$, $NO_2$, Cl, Br
$R_4$, $R_5$=$CH_3$, $C_2H_5$, $CH_2CH_2OH$

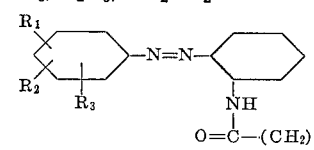

$R_1$, $R_2$, $R_3$=H, $CH_3$, $C_2H_5$, $OCH_3$, $OC_2H_5$, $OCH_2COOH$, COOH, $OCH_2COOR$, COOR, $NO_2$, Cl, Br, CN
$R_4$, $R_5$=$CH_3$, $C_2H_5$, $CH_2CH_2OH$, $CH_2CH_2OR$ (R=alkyl) $n$=0, 1, 2, 3

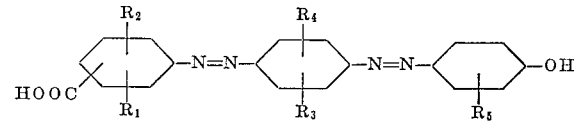

$R_1$, $R_2$=H, OH, $OCH_3$, Cl, $NO_2$, $CH_3$
$R_3$, $R_4$=H, $CH_3$, $C_2H_5$, $OCH_3$, $OC_2H_5$
$R_5$=H, $CH_3$, $OCH_3$, COOH

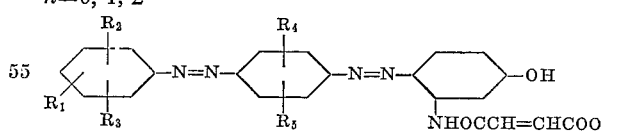

$R_1$, $R_2$, $R_3$=H, $CH_3$, $C_2H_5$, Cl, Br, $OCH_2COOH$, $OCH_3COOR$, COOH (R=alkyl)
$R_4$, $R_5$=H, $CH_3$, $C_2H_5$, $OCH_3$, $OC_2H_5$
$n$=0, 1, 2

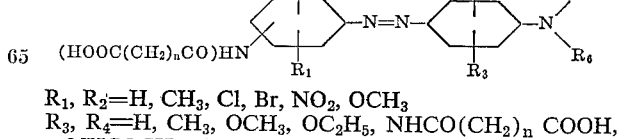

$R_1$, $R_2$, $R_3$=H, $CH_3$, $C_2H_5$, Cl, Br, $OCH_2COOH$, $OCH^3COOR$, COOH (R'=alkyl)
$R_4$, $R_5$=H, $CH_3$, $C_2H_5$, $OCH_3$, $OC_2H_5$

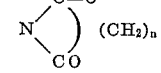

$R_1$, $R_2$=H, $CH_3$, Cl, Br, $NO_2$, $OCH_3$
$R_3$, $R_4$=H, $CH_3$, $OCH_3$, $OC_2H_5$, $NHCO(CH_2)_n$ COOH, NHCOCH—CHCOOH, $$N\begin{matrix}C=O\\ \\CO\end{matrix}(CH_2)_n$$

$R_5$, $R_6$=H, $CH_3$, $C_2H_5$, $CH_2CH_2OH$, $CH_2CH_2OR_7$ ($R_7$=aryl radical) $n$=0, 1, 2, 3,

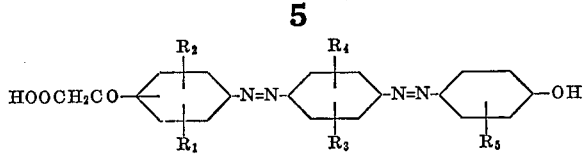

$R_1, R_2, R_3, R_4, R_5 = H, CH_3, C_2H_5, OCH_3$

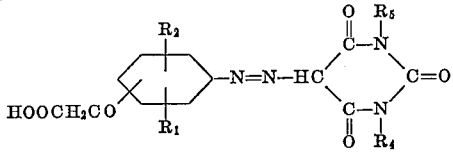

$R_1, R_2 = H, CH_3, C_2H_5, OCH_3, OC_2H_5, NO_2, Cl, Br$
$R_4, R_5 = CH_3, C_2H_5, CH_2CH_2OH$

The following diazo components may for instance be employed for building up these and other azo dyestuffs:

1-amine-4-methyl-benzene,
1-amino-4-chloro-benzene,
1-amino-4-bromo-benzene,
1-amino-4-nitro-benzene,
1-amino-4-cyano-benzene,
1-amino-4-methylsulphonyl-benzene,
methyl 4-amino-benzoate,
1-amino-2,4-dichloro-benzene,
1-amino-2-methyl-4-chloro-benzene,
1-amino-2-trifluoromethyl-4-chloro-benzene,
1-amino-2-cyano-4-chloro-benzene,
1-amino-2-chloro-4-cyano-benzene,
1-amino-2-chloro-4-nitro-benzene,
1-amino-4-chloro-2-methylsulphonyl-benzene,
1-amino-2-chloro-4-methylsulphonyl-benzene,
1-amino-2,4-dicyano-benzene,
1-amino-2-cyano-4-methylsulphonyl-benzene,
1-amino-4-cyano-2-methylsulphonyl-benzene,
1-amino-2,4-bis-(methylsulphonyl)-benzene,
1-amino-2,6-dichloro-4-nitro-benzene,
1-amino-2,6-dibromo-4-methylsulphonyl-benzene,
1-amino-2-methyl-4-nitro-benzene,
1-amino-2-trifluoromethyl-4-nitro-benzene,
1-amino-2-chloro-4-nitro-benzene,
1-amino-2-cyano-4-nitro-benzene,
1-amino-2-methylsulphonyl-4-nitro-benzene,
1-amino-2,4-dinitro-benzene,
1-amino-2,4-dinitro-6-chloro-benzene,
1-amino-2,4-dinitro-6-bromo-benzene,
1-amino-2,4-dinitro-6-cyano-benzene,
1-amino-4-acetylamino-benzene,
2-amino-6-cyano-benthiazole-1,3,
1-amino-4-methylsulphonyloxy-ethylsulphonyl-methylbenzene,
1-amino-2,6-dichloro-4-cyano-benzene,
1-amino-2-cyano-6-bromo-benzene,
1-amino-2-bromo-4-aceto-benzene,
2-amino-5-nitro-thiazole as well as its derivatives substituted at the 4-position by ethyl, cyano, trifluoromethyl, phenyl or substituted phenyl, 1-amino-2-nitro-4-aceto-benzene,
2-amino-thiophone,
5-amino-benzthiadiazole-1,2,3,
5-amino-thiadiazole-1,2,4,
5-amino-benzthiazole-1,3,
5-amino-benztriazole-1,2,3,
5-amino-3-benzylmercapto-thiadiazole-1,2,4,
2-amino-thiazole and
2-amino-4-phenyl-thiadiazole-1,3,5, as well as their derivatives with non-ionising substituents on the phenyl nucleus, amino-azo-benzene,
aminoazo-toluene,
1-acetylamino-3-amino-benzene,
1-amino-benzene-2-carboxylic acid,
1-amino-benzene-3-carboxylic acid,
1-amino-benzene-4-carboxylic acid,
1-amino-4-nitro-benzene-2-carboxylic acid,
1-amino-3-chloro-benzene-4-carboxylic acid,
1-amino-2-chloro-benzene-4-carboxylic acid,
1-amino-4-phenoxyacetic acid,
1-amino-3-phenoxyacetic acid,
1-amino-3-chloro-4-phenoxyacetic acid,
1-amino-4-hydroxy-benzene-3-carboxylic acid and
5-amino-1,2,4-triazole-3-carboxylic acid.

Suitable coupling components for building up the azo dyestuffs to be employed according to the invention are for instance those from the benzene, naphthalene, pyrazolone, acyl-acetic acid amide, aminopyrazole and hydroxy- or amino-quinoline series. The following may be mentioned as examples of the large number of components which may be employed:

1-phenyl-3-methyl-5-pyrazolone and its derivatives substituted at the phenyl nucleus, for instance by the substituents on page 5, 1-phenyl-5-pyrazolone-3-carboxylic acid and its estsers, in particular its esters with lower aliphatic alcohols, and also its derivatives further substituted at the phenyl nucleus, for instance the 3'- or 4'-carboxy-phenyl compounds, 1-phenyl-3-methyl-5-amino-pyrazole as well as its derivatives further substituted at the phenyl nucleus, for instance the 3'- or 4'-carboxy-phenyl compounds, acetoacetic acid alkyl-, aralkyl- and arylamides as well as their derivatives further substituted at the aralkyl and aryl radicals, for instance by —COOH groups α- and β-naphthylamine as well as their derivatives further substituted at the naphthyl nucleus, for instance by —COOH, α- and β-naphthol and their derivatives substituted at the aryl nucleus, such as 2,3-hydroxynaphthoic acid and its nuclear substitution products in particular, 8-hydroxy-quinoline, aniline derivatives such as alkyl, aralkyl and/or aryl substituted anilines or their nuclear substitution products, for instance 1-N,N-dimethylamino-3-amino-benzene,
1-N,N-diethylamino-3-amino-benzene,
1-N,N-di-β-cyanoethylamino-3-amino-benezene,
1-N,N-di-β-hydroxyethylamino-3-amino-benzene,
1-N,N-di-β-hydroxyethylamino-2-methoxy- or
-2-ethoxy-5-amino-benzene,
1-N-methyl-N-ethylamino-3-amino-benzene,
1-N-β-cyanoethyl-N-β-hydroxy-ethylamino-3-amino-benzene,
1-N-β-cyanoethyl-N-methylamino- or
-N-ethylamino-3-amino-benzene,
1-N-ethyl-N-β, γ-dihydroxypropyl-amino-2-methoxy-5-amino-benzene,
1-N,N-di-β-hydroxypropylamino-3-amino-benzene,
1-N-β-cyano-β-(trifluoromethyl)-ethylamino-3-amino-benzene,
1-N-β-hydroxy-β-(trifluoromethyl)-ethylamino-3-amino-benzene,
1-amino-2,5-dimethoxy-benzene,
1-amino-2-methyl-5-methoxy-benzene,
1-amino-2,5-dimethyl-benzene,
1-amino-benzene,
1-amino-2-methoxy-benzene,
1-amino-2-methyl-benzene,
1-amino-3-methoxy benzene and
1-amino-3-methyl-benzene, as well as the coupling components of the formula

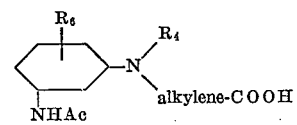

$Ac = OCCH_3, OCCH_2CH_3, OC(CH_2)_nCOOH,$
$OCCH=CH—COOH$
$n$ = whole number wherein $R_6$ denotes hydrogen, alkl or alkoxy and $R_4$ represents hydrogen or a substituent such as 1-(N-methyl- or -ethyl- or -propyl- or -isoproply-N-β carboxy, carbethoxy-ethyl)?amino-3-amino-benzene as well as their derivatives further substituted by methyl or methoxy at the 6-position, 1-N,N-di-(β-carboxyethyl)-amino-3-amino-benzene as well as its derivatives further substituted by methyl, methoxy or ethoxy at the 6-position, 1-(N-β-cyanoethyl- or -β-chloroethyl-N-β-carboxyethyl)-amino-3-amino-benzene as well as their derivatives further substituted by methyl or methoxy at the 6-position, and also 1-(N-β-methoxy- or -ethoxy- or -propoxy-carbonyloxyethyl)-amino-3-amino-benzene as well as its derivatives further substituted by methyl or methoxy at the 6-position, 1-N,N-di-(β-methoxy- or -ethoxy- or -propoxy-carbonyloxyethyl)-amino-3-amino-benzene as well as their derivatives further substituted by methyl or methoxy at the 6-position, and 1-(N-β-cyanoethyl- or -β-chloroethyl-N-β-methoxy- or -ethoxy-carbenyl-oxyethyl)-amino-3-amino-benzene as well as their derivatives further substituted by methyl or methoxy at the 6-position.

Azo dyestuffs containing carboxyl groups and having these constitutions or built up in other ways as well as anthraquinone dyestuffs containing carboxyl groups and the condensation products of the latter as well as dyestuffs from other classes which contain carboxyl groups have been described in a large number of patent specifications. By way of example, reference may be made to the following patents:

German Patents Nos. 261,885, 433,848, 455,823, 502,554, 638,835, 654,615, 677,860, 695,033, 1,048,374 and 1,117,233, German published specifications Nos. 1,049,821, 1,143,481 and 1,156,525, Swiss Patent No. 154,707, British Patents Nos. 508,314 and 794,177, French Patents Nos. 791,119, 847,706, 1,213,082, 1,255,348 and 1,262,441 and United States Patents Nos. 2,195,974, 2,051,004 and 2,921,945.

Suitable anthraquinone dyestuffs are for instance those containing one or several carboxyl groups in the anthraquinone molecule proper or in aryl or alkyl radicals linked to the anthraquinone molecule via bridge members such as amino, ether, thioether, sulphonamide or sulphonylamino groups. The anthraquinone compounds may for instance have the constitutions evident from the following table:

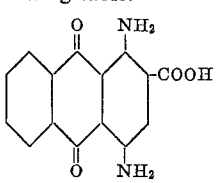
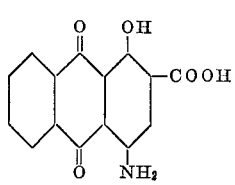
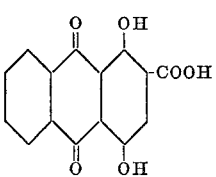
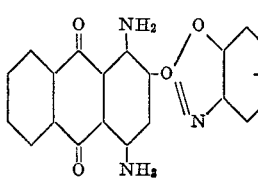
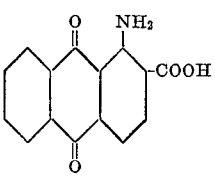
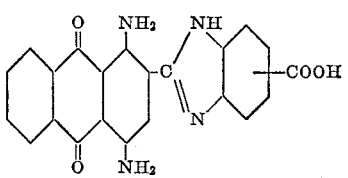
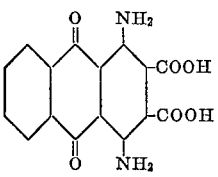
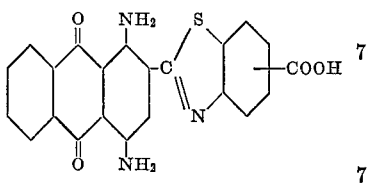
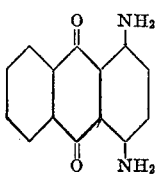

Acylation products of amino-anthraquinones with (a) 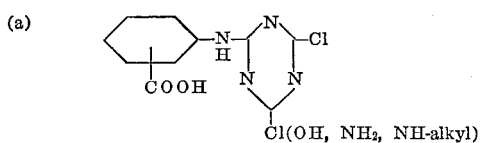

(b) 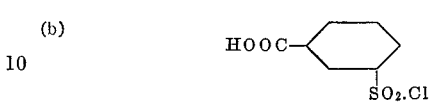

(c) HOOC—X—COOH

X=aryl, alkyl, heterocyclyl

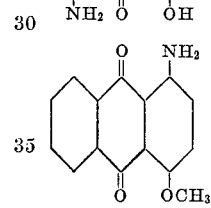
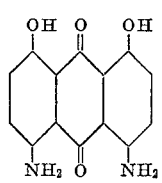
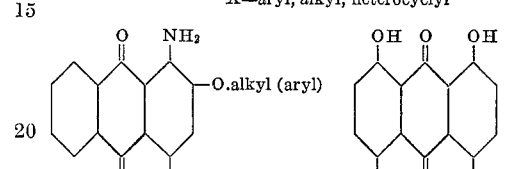
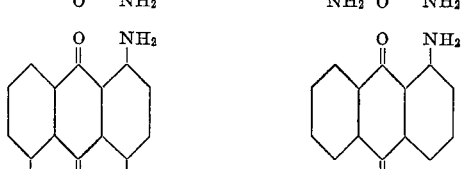
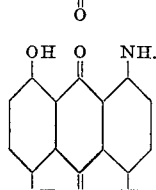
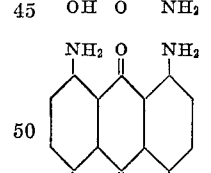
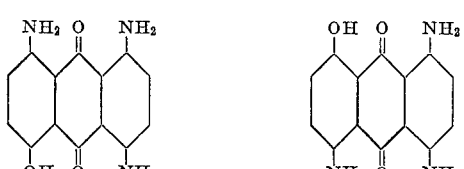
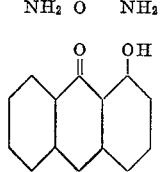
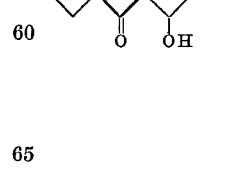
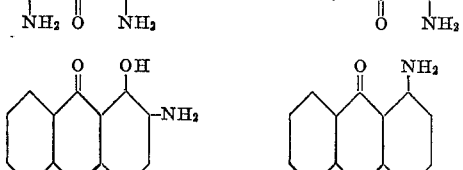
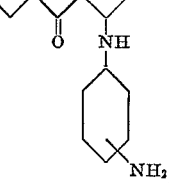

| Structure | -alkyl.COOH | O-alkyl.COOH | S-alkyl.COOH | NH.alkyl.COOH | O-aryl.COOH | S.aryl.COOH | NH-aryl.COOH | NH-aryl-O-alkyl.COOH | NH-aryl-arkyl.COOH | NH-aryl-S-alkyl.COOH |
|---|---|---|---|---|---|---|---|---|---|---|
| Anthraquinone 1,4-di-X | | | | X | | | | | | |
| 1-OH, 4-X anthraquinone | | | X | X | | X | X | | | |
| 1-NH₂, 4-X anthraquinone | | | X | X | | X | X | X | X | X |
| 1,4-diOH, X-anthraquinone | X | X | X | X | X | | | | | |
| 1-OH, 4-NH₂, X (2) | | | X | X | | | | | | |
| 1-OH, 4-NH₂, X (3) | | | X | X | | | | | | |
| 1,8-diOH, (NH₂)O₂N-, X | | | X | X | | X | | | | |
| 1,8-diOH, (NH₂)NO₂-, X | | | X | X | | X | | | | |
| 1,8-diOH, 4,5-diNH₂, X (2) | | | X | | X | X | | | | |
| 1,8-diOH, 4,5-diNH₂, X (2) | | | X | | X | | | | | |
| 1-NH,8-OH,4-OH,5-NH₂, X (2) | | | X | | X | X | | | | |
| 1-NH,8-OH,4-OH,5-NH₂, X (3) | | | X | | X | X | | | | |

The following may for instance be mentioned as examples of anthraquinone condensation products containing carboxyl groups which contain more than three anellated rings:

Isothiazole-anthrones such as

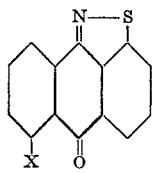

X=S-alkyl-COOH, NH-alkyl-COOH, S-aryl-COOH, NH-aryl-COOH

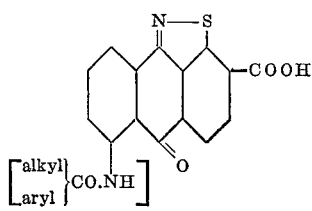

pyrazole-anthrones, such as

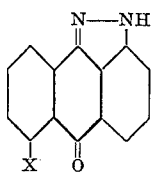

X=S-alkyl-COOH, NH-alkyl-COOH, S-aryl-COOH, NH-aryl-COOH

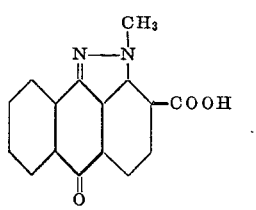

also the dyestuff of the type

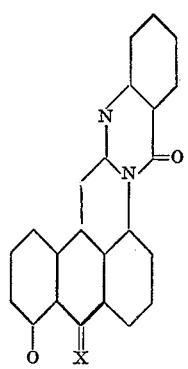

X=S-alkyl-COOH, NH-alkyl-COOH, S-aryl-COOH, NH-aryl-COOH

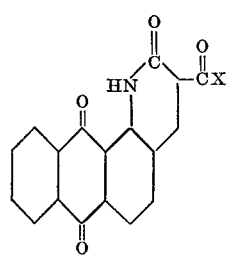

X=NH-alkyl-COOH, O-aryl-COOH, NH-aryl-COOH

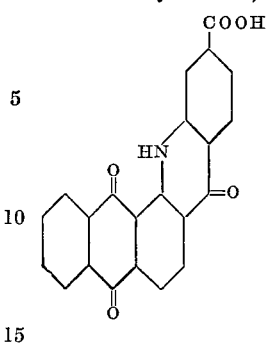
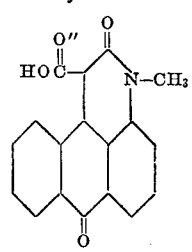
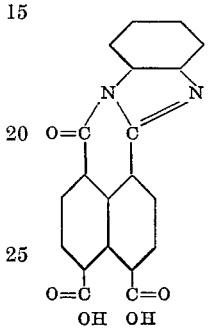
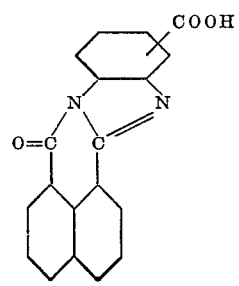

Anthraquinone dyestuffs of the given formulae are prepared according to the principles of synthesis known from the chemistry of anthraquinones. Condensation reactions with suitable starting products can in the first instance be considered for this purpose. It is thus for instance possible to condense anthraquinone compounds containing amino groups, wherein the amino groups are either at an external position or preferably attached to the nucleus, with suitable carboxyaryl acid halides or anhydrides, for instance carboxyphenyl- or carboxynaphthyl-sulphonic acid or -carboxylic acid chlorides or bromides to form the corresponding acid amides, or for instance to react anthraquinone compounds having labile halogen atoms, such as 1-amino- or 1- substituted-amino-4-bromo-anthraquinone-2-sulphonic acids, with carboxyarylamines, such as carboxyphenyl- or carboxy-napthylamines, to form the corresponding carboxy-aryl-aminoanthraquinone derivatives. It is also possible to use similar principles of synthesis for preparing anthraquinone-ether and -thioether derivatives wherein the carboxy groups are contained in the alkyl, aralkyl or aryl radicals of the ether or thioether component. A further possibility of synthesis for the anthraquinone dyestuffs which contain carboxyl groups to be employed according to the process is also given by the conversion of anthraquinone acid halides such as carboxylic acid and sulphonic acid chlorides or bromides with suitable amino or hydroxy compounds, which exhibit at least one additional carboxylic acid group, so as to form the corresponding amides or esters. It is of course also possible to employ those anthraquinone compounds for the present process wherein one or several carboxyl groups are attached to the nucleus or alternatively wherein carboxyl groups are present which are linked externally as well as to the nucleus.

Suitable azoporphine dyestuffs containing carboxyl groups are for instance built up by condensing metal phthalocyanine-sulphonic acid halides, and in particular copper and nickel phthalocyanine-sulphonic acid halides, or chloromethyl-substituted phthalocyanine dyestuffs with aminoaryl-carboxylic acids, aminoaralkyl-carboxylic acids or aminoalkyl-carboxylic acids.

Diarylamine dyestuffs containing carboxyl groups are also prepared by the condensation of suitable starting compounds such as carboxy-arylamines.

It has already been mentioned that in addition to the dyestuff and the volatile amine, the padding liquor may also contain other assistants where required, such as the sodium salts of highly condensed naphthalene-sulphonic acid/formaldehyde resins, sulphite cellulose spent liquor products, condensation products of higher alcohols with ethylene oxide (fatty alcohol polyglycol ethers), polyglycol ethers of fatty acid amides and alkyl-phenols, sulphosuccinic acid esters, Turkey Red oil, alkyl phenyl polyglycol ethers, alkyl pyridinium chlorides, alkyl naphthalene sulphonic acids, alginic acid derivatives, modified carob bean flour, decomposed starch, British gum, crystal gum, polyacrylic acid amide, hydroxymethyl cellulose, carboxymethyl cellulose or methyl cellulose.

Fully synthetic and semi-synthetic fibre materials of widely varying character can be dyed in accordance with the process of the invention. The process is of special interest for padding fabrics with fibres of aromatic polyesters, in particular of polyethylene terephthalates and of polyesters from terephthalic acid and 1,4-bis-hydroxymethyl-cyclohexane, and of cellulose triacetate. Highly advantageous results are obtained on these materials in particular. The resultant dyeings are characterized by good general fastness properties and are characterized by better homogeneity and fastness of the dyeing to sublimation and abrasion in comparison with dyeings carried out according to the dispersion dyeing procedure employing dyestuffs containing carboxyl groups in the form of the free acids or their sodium salts.

The following examples are given for the purpose of illustrating the invention.

Example 1

13.4 parts by weight of the monoazo dyestuff from 4-nitro-1-amino-benzene-2-carboxylic acid→1-N,N-di-β-hydroxyethylamino-3-methyl-benzene are dissolved in 1000 parts by volume of water by the addition of 27 parts by volume of 30% ammonium hydroxide solution. At the same time, 10 parts by weight of a mixture of oleic acid ethanolamide and urea and 20 parts by weight of a condensation product from resorcinol and thiodiglycol with ethylene oxide are also added. A fabric of polyethylene terephthalate is padded with this liquor, subjected to intermediate drying and thereafter heated at 190° C. for 60 seconds. The dyed fabric is then washed, in the cold first of all and thereafter in the hot, and the dyeing is subsequently treated for 3 minutes in a solution of 5 parts by weight of sodium dithionite and 2 parts by weight of sodium hydroxide solution (38° Bé.) in 1000 parts by volume of water in order to improve its fastness properties. The fabric has been dyed to a violet shade, and the dyeing has excellent fastness to sublimation and to abrasion.

Example 2

9 parts by weight of the disazo dyestuff from 1-amino-4-phenoxy-acetic acid→1-amino-3-methyl-benzene→ hydroxybenzene are dissolved in 1000 parts by volume of water by the addition of 20 parts by weight of diethyl-β-hydroxyethylamine. A polyethylene terephthalate fabric is impregnated with this padding liquor, squeezed off, subjected to intermediate drying and thereafter heated at 190° C. for 60 seconds. The dyed fabric is then washed, in the cold first of all and thereafter in the hot, and it is finally treated for 3 minutes in a solution of 5 parts by weight of sodium dithionite and 2 parts by weight of sodium hydroxide solution (38° Bé.) in 1000 parts by volume of water. The fabric has been dyed to an orange shade and the dyeing has excellent fastness to sublimation and to abrasion.

When the dyestuffs listed in the following table are applied during the procedure of this example, where the azo dyestuffs were in each case obtained by coupling the diazo component in Column 1 with the coupling component in Column 2, by renewed diazotisation where necessary and in that case further coupling with the azo component in Column 3, valuable dyeings are again obtained on aromatic polyesters with the specified colour shades.

| Diazo component | First coupling component | Second coupling component | Colour shade |
| --- | --- | --- | --- |
| 1-amino-3-carboxy-4-hydroxy-benzene | Amino-benzene | N,N-di-β-hydroxyethylamino-benzene. | Red brown. |
| 1-Amino-4-phenoxyacetic acid | 1-amino-3-methyl-benzene | 1-hydroxy-benzene-2-carboxylic acid. | Orange. |
| 1-amino-2,4-dinitro-benzene-6-carboxylic acid | 3-methyl-N,N-di-β-hydroxyethyl amino-benzene | | Reddish blue. |
| 1-amino-2-chlorobenzene-5-carboxylic acid | 1-N,N-di-β-hydroxyethylamino-3-methyl-benzene | | Reddish orange. |
| 1-amino-5-nitrobenzene-2-carboxylic acid | 1-phenyl-5-pyrazolone-3-carboxylic acid | | Yellow. |
| 1-amino-2-chlorobenzene-5-carboxylic acid | 2-hydroxynaphthalene-3-carboxylic acid | | Red. |
| 4-chloro-3-aminobenzoic acid | N,N-di-(β-hydroxyethyl)-3-methylaminobenzene | | Reddish yellow. |
| 5-chloro-2-aminobenzoic acid | do | | Red. |
| 4-chloro-3-aminobenzoic acid | N,N-di-(β-hydroxyethyl)-aminobenzene | | Reddish yellow. |
| 3-nitro-aminobenzene | N-N-di-(β-carboxymethyl)-aminobenzene | | Do. |
| 5-chloro-2-aminobenzoic acid | N,N-di-(β-hydroxyethyl)-aminobenzene | | Scarlet. |
| 4-nitro-2-carboxy-1-aminobenzene | N,N-di-(β-hydroxyethyl)-3-methyl-1-aminobenzene | | Violet. |
| Do | 1-phenyl-5-pyrazolone-3-carboxylic acid | | Reddish yellow. |
| Do | N,N-di-(β-cyanoethyl)-aminobenzene | | Red. |
| 2-chloro-4-nitro-1-aminobenzene | 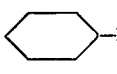 | | Red. |
| 4-chloro-3-aminobenzoic acid | 1-(3'-carboxy)-phenyl-3-methyl-5-pyrazolone | | Yellow. |
| 4-amino-benzoic acid methylester | 1-(3'-carboxy)-phenyl-3-methyl-5-pyrazolone | | Do. |
| 4-amino-benzoic acid | 1-(3'-carboxy)-phenyl-3-methyl-5-pyrazolone | | Do. |
| 4-amino-benzoic acid methylester | 1-(3'-carboxy-4'-chloro)-phenyl-3-methyl-5-pyrazolone | | Do. |
| 5-amino-1,2,4-triazole-3-carboxylic acid | N,N-di-(β-cyanoethyl)-aminobenzene | | Do. |
| 3-amino-benzoic acid | 1-amino-2,5-dimethoxybenzene | 1-carboxy-2-hydroxy-benzene. | Brown. |
| 4-nitro-2-cyano-1-aminobenzene | N,N-di-(β-carboxyethyl)-2-ethoxy-5-acetamino-1-aminobenzene. | | Navy blue. |
| 2,4-dinitro-6-bromo-1-aminobenzene | N,N-di-(β-carboxyethyl)-2-ethoxy-5-acetamino-1-aminobenzene. | | Greenish blue. |
| 4-aminophenoxy-acetic acid | 1-amino-3-methylbenzene | Hydroxybenzene. | Yellowish orange. |
| 4-nitro-2-carboxy-1-aminobenzene | N,N-di-(β-hydroxyethyl)-aminobenzene | | Violet. |

| Diazo component | Coupling component | Colour shade |
|---|---|---|
| 3-phenyl-5-aminothiadiazole-(1,2,4) | 1-dimethylamino-3-glutar-aminobenzene | Red-brown. |
| 4-aminoazobenzenesalicylic acid | Dihydroxyethyl-m-toluidine | Do. |
| 2-amino-3,5-dinitrobenzoic acid | do | Blue-violet. |
| 4-amino-benzoic acid | Phenyl-methyl-methyl-pyrazolone | Yellow. |
| 2-amino-5-nitrobenzonitrile | 3,3'-anilino-dipropionic acid | Red. |
| 2,4-dinitraniline | do | Red-brown. |
| 2-amino-5-nitrobenzoic acid | 1-diethylamino-3-acetaminobenzene | Violet. |
| 2-amino-5-nitrobenzonitrile | 1-methoxy-2-dihydroxyethylamino-4-glutaraminobenzene | Blue. |
| Do | Dihydroxyethylaniline-bisglutaric acid semi ester | Bluish red. |
| 3-amino-benzoic acid | Phenyl-methyl-pyrazolone | Yellow. |
| 3-amino-4-methoxybenzoic acid | do | Do. |
| 4-amino-benzoic acid | 3-aminophenyl-methylpyrazolone | Do. |
| 2-chloro-4-nitraniline | 3,3'-anilino-dipropionic acid | Red. |
| 2-amino-5-nitrobenzonitrile | 1-methoxy-2-amino-bispropionic acid-4-methylbenzene | Violet. |
| 2-chloro-4-nitraniline | 3,3'-m-toluido-dipropionic acid | Red. |
| 2,6-dichloro-4-nitraniline | 3,3'-anilino-dipropionic acid | Brown-orange. |
| 4-amino-benzoic acid | p-Cresol | Reddish yellow. |
| 2-chloro-5-trifluoromethylaniline | 3,3'-anilino-dipropionic acid | Orange. |
| Do | 3,3'-m-toluido-dipropionic acid | Do. |
| 2,6-dichloro-4-nitraniline | do | Red-brown. |
| 2,5-dichloro-4-nitraniline | do | Red. |
| 2-chloro-4-nitraniline | N-ethyl-anilino-3'-propionic acid | Red. |
| 2-amino-5-nitrobenzoic acid | do | Violet. |
| Do | N-cyanoethyl-N-propionic acid-aniline | Red. |
| 3-amino-1,2,4-triazole-5-carboxylic acid-azo-1-methyl-3-amino-4-methoxybenzene. | Dihydroxyethyl-m-toluidine | Bordeaux. |
| 3-amino-1,2,4-triazole-5-carboxylic acid-azoamino-hydroquinone-dimethylether. | do | Do. |
| 2-amino-5-nitrobenzoic acid | N-cyanoethyl-N-propionic acid-m-toluidine | Red-violet. |
| 2-amino-5-nitrobenzonitrile | 1-ethoxy-2-amino-4-glutaraminobenzene | Violet. |
| 2-amino-5-nitrophenoxy acetic acid | N-cyanoethyl-N-propionic acid-aniline | Red. |
| 2-chloro-4-nitraniline | 3-anilino-mono-propionic acid | Red. |
| 2-amino-5-nitrobenzonitrile | 3-anilino-mono-propionic acid | Red-brown. |
| 2-amino-4-chlorobenzonitrile | 3,3'-m-toluido-dipropionic acid | Orange. |
| 2-amino-5-nitrobenzonitrile | Dihydroxyethyl-aniline-bisphthalic acid semi ester | Violet. |
| 2-chloro-4-nitraniline | do | Red. |
| Do | Dihydroxyethyl-aniline-bisglutaric acid semi ester | Red-brown. |
| Do | Methyl-hydroxyethyl-aniline-glutaric acid semi ester | Red. |
| 2-amino-4-chlorobenzonitrile | do | Orange. |
| 2-chloro-4-nitraniline | Methyl-hydroxyethyl-aniline-succinic acid semi ester | Red. |
| 2-amino-5-nitrobenzonitrile | 1-ethoxy-2-dihydroxyethylamino-4-acetaminobenzene-bisglutaric acid semi ester. | Blue. |
| 2,4-dinitro-6-bromo-aniline | 1-ethoxy-2-dihydroxyethylamino-4-acetaminobenzene-bisglutaric acid semi ester. | Blue. |

| Dyestuffs | Colour shade |
|---|---|
| 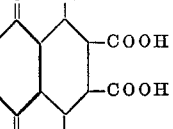 | Red. |
| 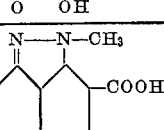 | Greenish yellow. |
| 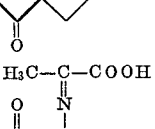 | Yellowish brown. |
| 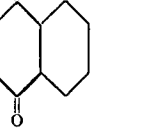 | Dull blue. |

We claim:

1. In the process for dyeing linear polyester fibre-materials the improvement which comprises applying onto said materials an aqueous padding liquor containing a water-insoluble or slightly water-soluble dyestuff having at least one carboxylic acid group and a volatile amine in an amount sufficient to dissolve the said dyestuff, then drying the padded material and subsequently heating at temperatures between 150 and 220° C., and driving off said volatile amine.

2. Process according to claim 1 wherein the said carboxylic acid group-containing dyestuff is selected from the class consisting of monoazo, disazo, anthraquinone and azaporphine dyestuff.

3. Process according to claim 1 wherein the said volatile amine is at least one member selected from the class consisting of ammonium hydroxide, N,N-diethyl-N-β-hydroxyethylamine, N,N-dimethyl-N - β - hydroxyethylamine and ammonia.

4. Process according to claim 1 wherein the padding liquor contains as a dispersing agent a condensation product of a higher alcohol with ethylene oxide.

5. Process according to claim 1 wherein the fibre materials are aromatic polyesters.

6. Process according to claim 1 wherein ammonia is used as the volatile amine.

7. Linear polyester fibre materials dyed in accordance with the method of claim 1.

8. Aromatic polyester fibre material dyed according to the process of claim 1.

9. Polyethyleneglycol terephthalate fibrous materials dyed in accordance with the method of claim 1.

References Cited

UNITED STATES PATENTS

| | | | |
|---|---|---|---|
| 2,203,493 | 6/1940 | Evans et al. | 8—85 X |
| 2,594,803 | 4/1952 | Riat et al. | 8—42 |
| 2,926,986 | 3/1960 | Petitcolas et al. | 8—45 |
| 2,982,597 | 5/1961 | Salvin et al. | 8—59 |
| 3,016,280 | 1/1962 | Fortess et al. | 8—59 |
| 3,281,201 | 10/1966 | Mautner et al. | 8—42 |

GEORGE F. LESMES, Primary Examiner

T. J. HERBERT, JR., Assistant Examiner

U.S. Cl. X.R.

8—41, 84, 85, 172, 179